United States Patent
Maxwell et al.

(10) Patent No.: US 9,015,779 B2
(45) Date of Patent: Apr. 21, 2015

(54) STREAMING VIDEO SERVER WITH SEGMENT LENGTH CONTROL AND METHODS FOR USE THEREWITH

(71) Applicant: Morega Systems Inc., Toronto (CA)

(72) Inventors: Thomas Walter Maxwell, Brampton (CA); Preetkanwal Samra, Brampton (CA)

(73) Assignee: Morega Systems, Inc, Toronto (CA)

( * ) Notice: Subject to any disclaimer, the term of this patent is extended or adjusted under 35 U.S.C. 154(b) by 52 days.

(21) Appl. No.: 13/754,124

(22) Filed: Jan. 30, 2013

(65) Prior Publication Data

US 2014/0215536 A1  Jul. 31, 2014

(51) Int. Cl.

| | |
|---|---|
| H04N 7/173 | (2011.01) |
| H04N 21/472 | (2011.01) |
| H04N 21/61 | (2011.01) |
| H04N 21/643 | (2011.01) |
| H04N 21/43 | (2011.01) |
| H04N 21/482 | (2011.01) |
| H04N 21/845 | (2011.01) |
| H04N 19/119 | (2014.01) |
| H04N 19/162 | (2014.01) |
| H04N 19/177 | (2014.01) |
| H04N 19/179 | (2014.01) |

(52) U.S. Cl.
CPC ..... *H04N 21/47202* (2013.01); *H04N 21/6175* (2013.01); *H04N 21/64322* (2013.01); *H04N 21/4305* (2013.01); *H04N 21/4825* (2013.01); *H04N 21/845* (2013.01); *H04N 19/119* (2014.11); *H04N 19/162* (2014.11); *H04N 19/177* (2014.11); *H04N 19/179* (2014.11)

(58) Field of Classification Search
None
See application file for complete search history.

(56) References Cited

U.S. PATENT DOCUMENTS

| | | | | |
|---|---|---|---|---|
| 5,661,523 | A  * | 8/1997 | Yamane | 348/390.1 |
| 5,936,659 | A  * | 8/1999 | Viswanathan et al. | 725/103 |
| 7,301,944 | B1 * | 11/2007 | Redmond | 370/390 |
| 2007/0214490 | A1* | 9/2007 | Cheng et al. | 725/135 |
| 2012/0007753 | A1* | 1/2012 | Maeda | 341/67 |

* cited by examiner

*Primary Examiner* — Oschta Montoya

(74) *Attorney, Agent, or Firm* — Garlick & Markison; Bruce E. Stuckman

(57) ABSTRACT

A streaming server includes a virtual file system that stores playlist data corresponding to video programs available from at least one video source and that further stores variant playlist data corresponding to each of the video programs for streaming. A command handler receives a request for a video program from a client device. A video encoder encodes the selected video program into a plurality of video program segments in response to the request. The plurality of video program segments each have a length that is controlled based on length data, wherein the plurality of video segments includes one or more initial video program segments having at least one initialization length and steady state video program segments having a steady state length where the initialization length is less than the steady state length.

10 Claims, 13 Drawing Sheets

Content index 120

| Title | URL |
|---|---|
| Moon Wars | www.Morega.com/bwetyuyt |
| The Duchy Strikes Back | www.Morega.com/ashdkjhk |
| Return of the Antennae | www.Morega.com/qweiocbn |
| ... | ... |

Playlist data 112

Segment playlist 122

Title: Moon Wars

| Segment# | Segment Address | Encryption Key URL |
|---|---|---|
| 00000001 | www.Morega.com/bwt00000001 | www.Morega.com/bwt00000001ec |
| 00000002 | www.Morega.com/bwt00000002 | www.Morega.com/bwt00000002ec |
| 00000003 | www.Morega.com/bwt00000003 | www.Morega.com/bwt00000003ec |
| ... | ... | ... |

FIG. 3

Variant playlist data 114

| Title | Bit Rate | Segment Playlist Address |
|---|---|---|
| Moon Wars | 256 kbps | www.Morega.com/256btw00000000 |

FIG. 4

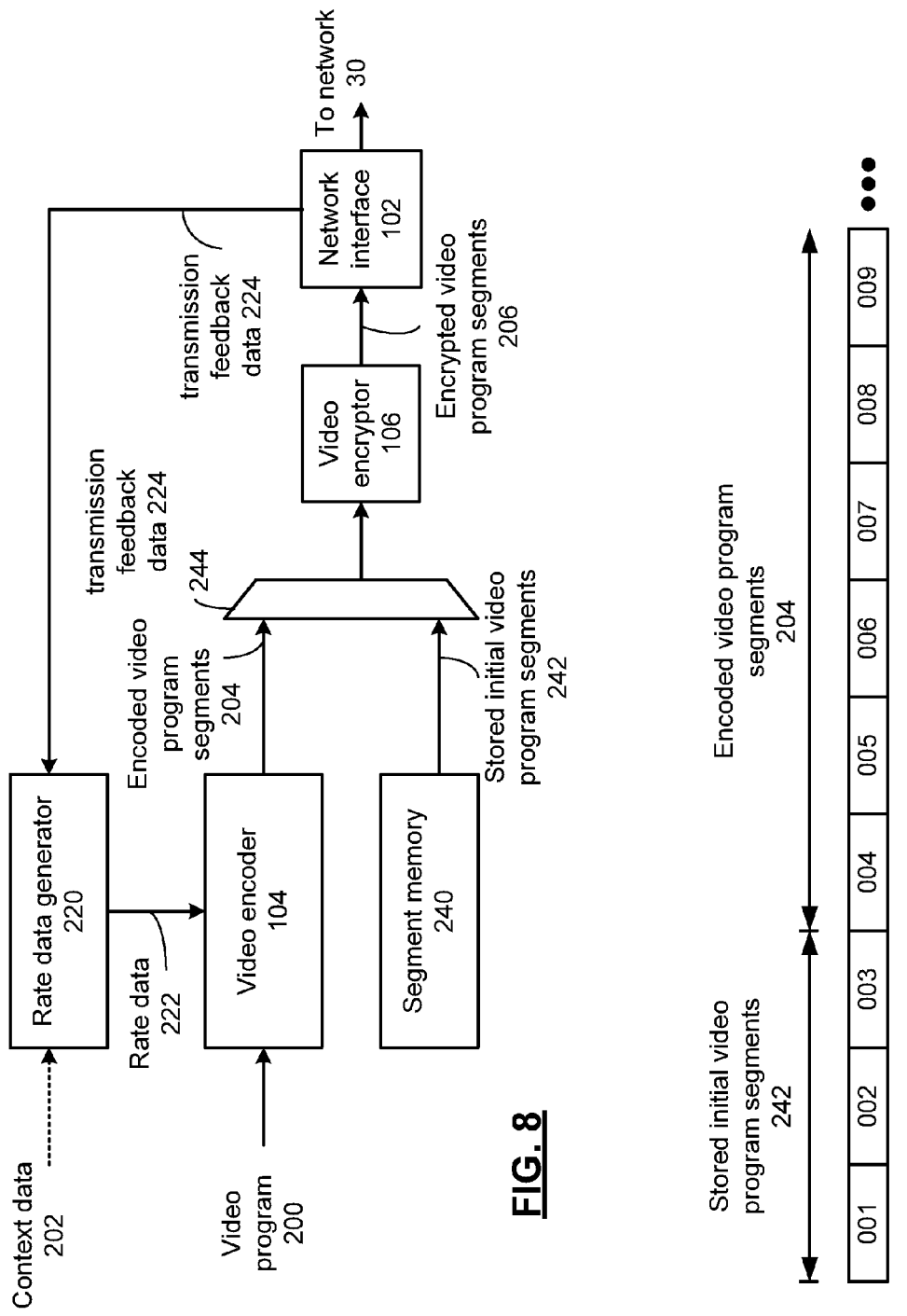

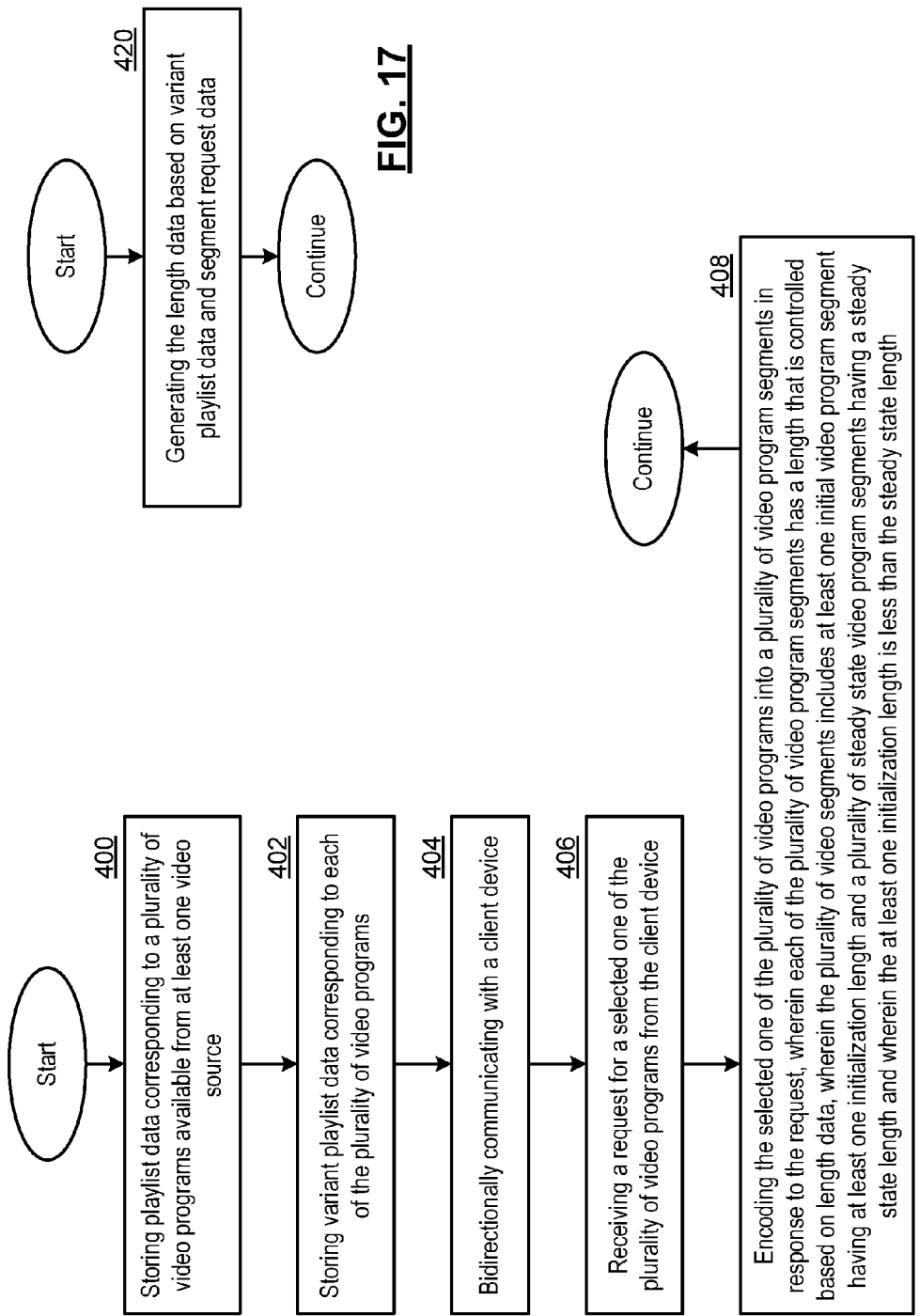

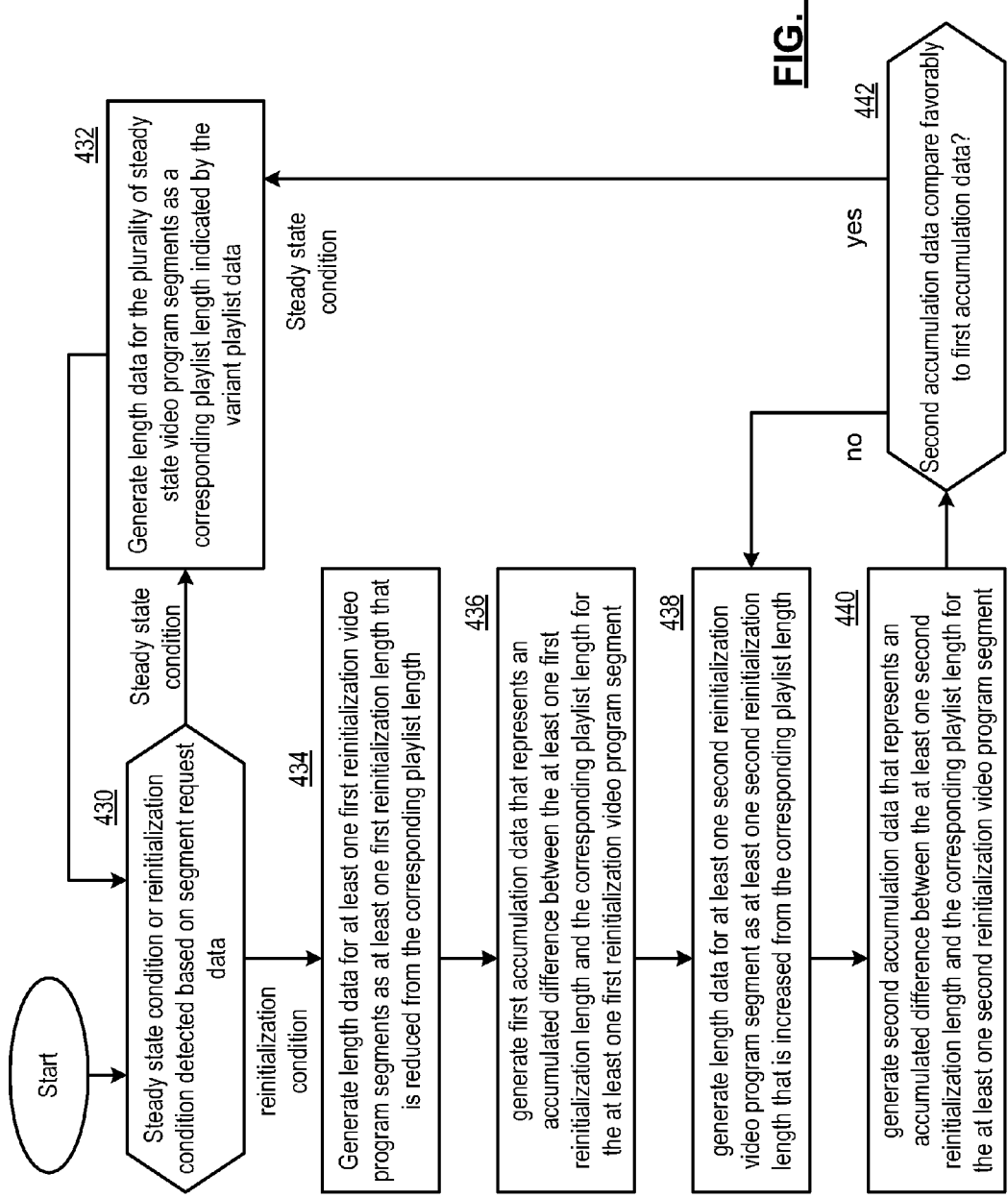

STREAMING VIDEO SERVER WITH SEGMENT LENGTH CONTROL AND METHODS FOR USE THEREWITH

CROSS REFERENCES TO RELATED APPLICATIONS

None

TECHNICAL FIELD OF THE INVENTION

The present invention relates to servers and client devices used for streaming media applications, including video on demand.

DESCRIPTION OF RELATED ART

The number of households having multiple television sets is increasing, and many users want the latest and greatest video viewing services. As such, many households have satellite receivers, cable set-top boxes, and televisions, et cetera, that provide access to broadcast video services. For in-home Internet access, each computer or Internet device can have its own Internet connection. As such, each computer or Internet device may include a modem. As an alternative, an in-home wireless local area network may be used to provide Internet access and to communicate multimedia information to multiple devices within the home. In such an in-home local area network, each computer or Internet device includes a network card to access an IP gateway. The gateway provides the coupling to the Internet. As an alternative to broadcast video, the Internet provides access to streaming video services. Instead of broadcasting all programming to every customer, each customer receives only those programs that they want, when they want them.

One of the most common ways of streaming continuous video over the Internet today is through the use of the "HTTP Live Streaming" (HLS) protocol. It is developed by Apple Corporation and supported in most of Apple's devices. The HLS protocol operates on a streaming server that uses a standard HTTP (Hypertext Transfer Protocol) web server component. A video encoder takes a source video and encodes it at different bitrates intended for use in different network conditions (high or low capacity) and with different playback devices. The stream is a Motion Picture Expert Group (MPEG2) transport stream divided into multiple segments. Each segment is a compressed piece of the original video of several seconds length. If a segment length is 10 seconds, a one hour movie could be streamed in 360 segments. The segments, put together, form the stream and include the bits from the binary compressed version of the content. Each segment is downloadable over HTTP and accessible via URL. In operation, a client device that wishes to play a streaming video requests and downloads each segment of the stream via separate URL. The segments are decoded by the client device in sequence to play the stream.

In HLS streaming, the user of client device may be permitted to change a current position of playing video with a scroll bar of the video player (hereinafter, "scrubbing"). During scrubbing, the video player may send a number of "spurious" content requests. For instance, if a user wants to jump from a segment #40 which is a segment which is begin currently played to a segment #100, the following sequence of requests can be generated.

..., #38, #39, #40, #45, #73, #60, #100, #101, #102, ...

Depending on the implementation of the video player 310 and/or streaming video server 50 or 50', serving of these spurious requests may be time consuming. For instance, a reseeking of the current position of playing may take much time. In the example above, the requests for each of the segments #45, #73, #60, #100 would demand reseeking.

The limitations and disadvantages of HLS and other conventional and traditional approaches will become apparent to one of ordinary skill in the art through comparison of such systems with the present invention.

BRIEF DESCRIPTION OF THE SEVERAL VIEWS OF THE DRAWINGS

FIG. 3 presents a block diagram representation of playlist data 112 in accordance with an embodiment of the present invention.

FIG. 4 presents a block diagram representation of variant playlist data 114 in accordance with an embodiment of the present invention.

FIG. 8 presents a block diagram representation of an encoder 104 in accordance with an embodiment of the present invention.

FIG. 9 presents a temporal diagram representation of program segments in accordance with an embodiment of the present invention.

FIG. 16 presents a flowchart representation of a method in accordance with an embodiment of the present invention.

FIG. 17 presents a flowchart representation of a method in accordance with an embodiment of the present invention.

FIG. 18 presents a flowchart representation of a method in accordance with an embodiment of the present invention.

DETAILED DESCRIPTION OF THE INVENTION INCLUDING THE PRESENTLY PREFERRED EMBODIMENTS

Figure 1:
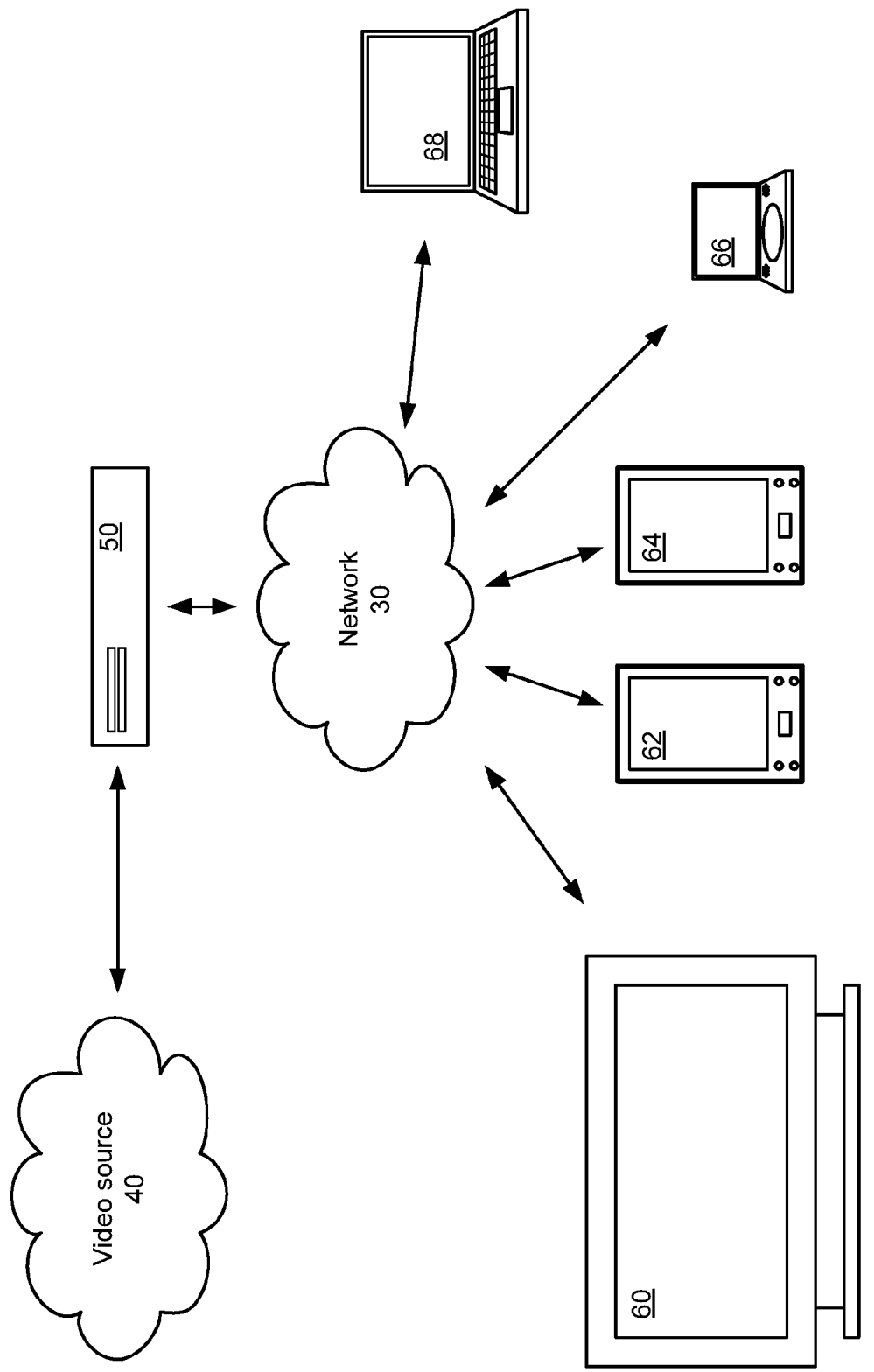
FIG. 1 presents a pictorial representation of a content distribution system that in accordance with an embodiment of the present invention.

FIG. 1 presents a pictorial representation of a content distribution system in accordance with an embodiment of the present invention. In particular, a streaming video server 50 is capable of accessing and distributing content from one or more video sources 40 to a plurality of client devices such as a television 60, smart phone, internet tablet or other personal media players 62 and 64, handheld video player 66, and personal computer 68. While specific client devices are shown, video server 50 is capable of accessing and distributing content from one or more video sources 40 to other client devices that can receive and reproduce media content.

The streaming video server 50 uses an on-demand encoding process and a virtual file system. In an embodiment of the present invention, the streaming video server 50 allows adaptable bitrates to be supported with reduced requirements for persistent storage. The streaming video server 50 accesses a virtual file system containing the files needed for streaming: variant playlist files, playlist files, content encryption keys, and video segment files. Most of the video data in the file system is not stored in a real non-volatile storage device; instead the data may be generated only when necessary due to a read operation in request for particular video content from a client device.

In the example shown, the video source or sources 40 are external to the system and coupled to the streaming video server 50 to provide coded audio-video streams via a secure channel, such as a secure socket layer (SSL) connection, a private network, a virtual private network or other secure connection. The video source or sources 40 can have two types of content: live and pre-recorded. The video source 40 can be a live video source such as a broadcast cable network, a broadcast satellite network, a broadcast television network, an IP television distribution system, a broadcast mobile network, a video conferencing service or other source of live video. Example of video sources 40 of prerecorded content include a video on demand source such as a YouTube, Hulu, Netflix, or other streaming video source, a cable or IP television video on demand network, a digital video recorder, UPnP media server, camcorder, personal computer or other source of stored video. The two types of content can be handled differently when limited network bandwidth causes the rate of data transfer to the client to be lower than the encoding rate. For live content, the streaming system discards portions of the audio-video stream that could not be transferred within some time limit. This ensures that the delay between transmission at the source, and decoding and playback at the client is bounded. For a video conference, this means that conversations will not be hampered by excessive delays, but there may be discontinuities in the conversation when the network slows suddenly. Pre-recorded content can be streamed in a continuous manner. If the network slows suddenly and the client runs out of data to decode, it handles this in the short term by waiting for more data, and in the longer term by selecting a variant playlist with a lower bitrate.

In operation, the streaming video server 50 transcodes or decodes and re-encodes the content from a video source 40 to the bitrates corresponding to the playlists. In this fashion, encoding of a video program is performed only when it is needed in response to a client's request for that particular program. Therefore, videos that are made available by the streaming video server 50, but never requested by the client, do not incur the overhead of encoding.

When streaming is initiated, a video encoder of streaming video server 50 is allocated for the session. The encoder outputs a continuous audio-video bitstream and then a post-processing step breaks the streaming into the required segments. In addition, the encryption key generation process can be performed on-demand. This allows the keys to not be saved to a storage device, protecting the security of the key from being read without authorization. For increased content security, the keys can be generated randomly and are never used for more than one streaming session. The encryption process can also be performed on-demand.

In operation, the streaming video server 50 produces segments in-order, i.e. 100, 101, 102 and so on. This works well if the requests from the client come in order. However, every request out of order requires repositioning in the input stream and therefore restarts the transcoder from this new position. This action can lead to a delay of 10-20 seconds. If HLS bitrate control were implemented as per specification, each change of bitrate by the client would result in a request of an out of order segment, leading to a delay. Further, each delay could make the client to think that there is not enough network bandwidth, and the client could respond by lowering the bitrate even more. Ultimately, this could result where the client continues to switch the bitrate until the lowest possible bitrate is reached.

To address this issue, the streaming video server 50 presents a variant playlist that indicates only a single bitrate, i.e. a single variant (a single entry on the list—as opposed to multiple bitrate choices). This eliminates attempts at rate control from the client side. Instead, the streaming video server 50 measures the network bandwidth on the server side, and adjusts the bitrate of the generated video stream according to the current network conditions. As the client doesn't perform any bitrate control, it never sends an out-of-order request, and the transcoder is never restarted during bitrate adjustment.

Streaming video server 50 can further include one or more features of the present invention described further in conjunction with FIGS. 2-18 that follow.

Figure 2:
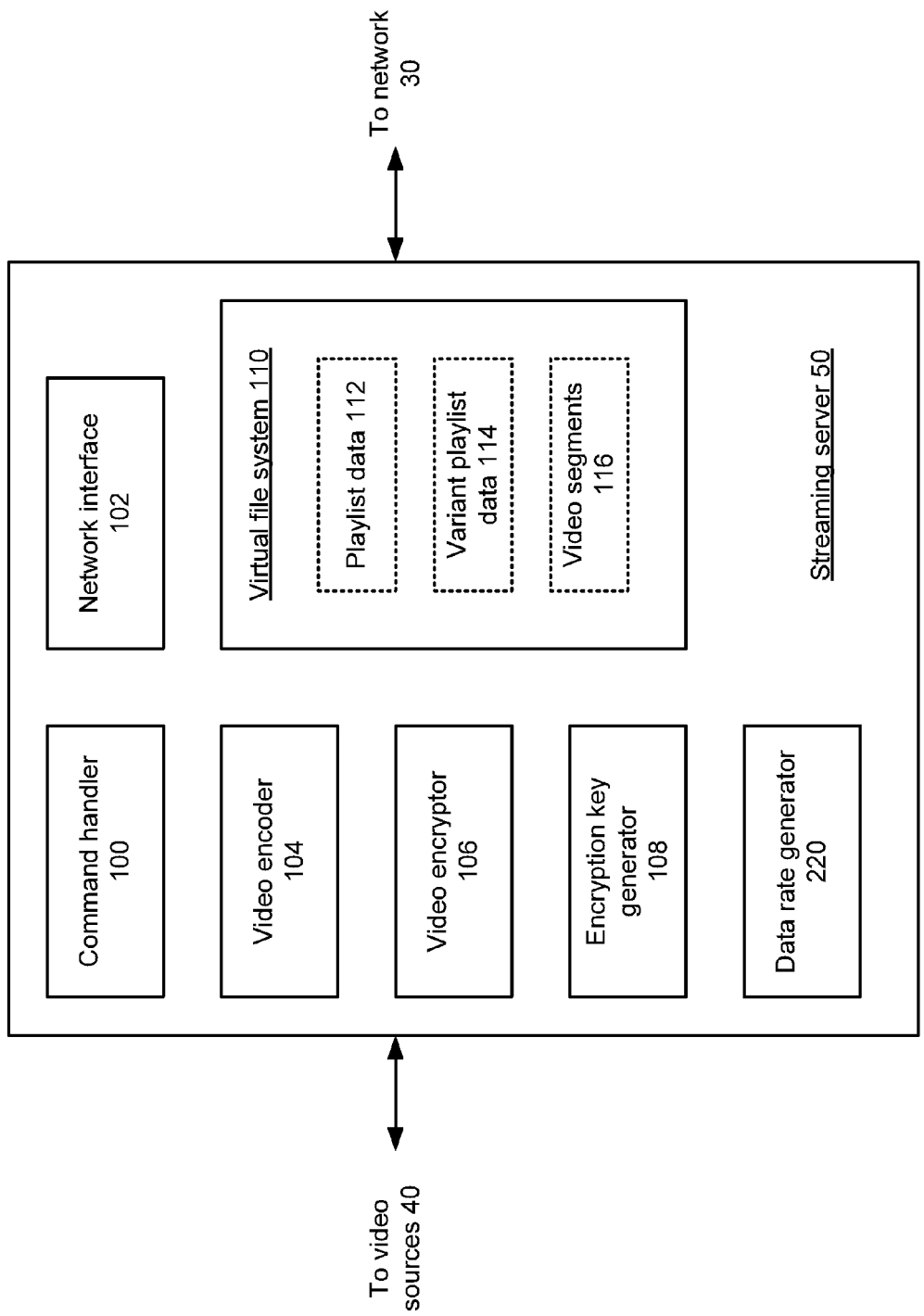
FIG. 2 presents a block diagram representation of streaming server 50 in accordance with an embodiment of the present invention.

FIG. 2 presents a block diagram representation of streaming server 50 in accordance with an embodiment of the present invention. As shown, streaming video server 50 includes a command handler 100, one or more video encoders 104 and video encryptors 106, and an encryption key generator 108. Streaming video server 50 also includes virtual file system 110 that stores playlist data 112 that includes a content index corresponding to the video programs available from the video source or sources 40 as well as a segment playlist for each video program that includes a list of addresses for each segment of that video program. Virtual file system 110 further stores variant playlist data 114 that indicates a single entry for streaming each of the plurality of video programs. The URIs in the content index, variant playlist, and segment playlist may or may not correspond to actual files as in a traditional web server or streaming server that serves files stored on hard drive. These addresses are generated by the streaming video server 50 and recognized as references to the virtual files when the client makes the HTTP request for a particular video program. This applies to the URIs for the lists themselves and also for the encrypted segment data and encryption keys. When a request is received for a "file" in the virtual file system, the server generates the appropriate response depending on the actual request. For example, (a) responding with the content index, variant playlist, segment playlist data using information stored in memory, (b) generating a random encryption key, storing it to memory (for subsequent segment requests), and sending it in the response to the client, (c), initiating video transfer from a source, initiating the encoding and segmentation, sending the first segment in the response to the client, (d) for a previously initiated transfer, encoding, segmenting, and return the next segment to the client.

A network interface 102 is included to bidirectionally communicate with at least one client device via network 30 and to bidirectionally communicate with the at least one video source, such as via a secure channel of network 30 or another network. The network interface 102 can include a modem, network card, transceiver and/or other network interface adaptor that implements a serial and/or parallel connection such as an Ethernet connection, Universal Serial Bus (USB) connection, an Institute of Electrical and Electronics Engineers (IEEE) 1394 (Firewire) connection, small computer serial interface (SCSI), high definition media interface (HDMI) connection or other wired connection that operates in accordance with either a standard or custom interface protocol. In addition or in the alternative, the network interface 102 can include a wireless link for coupling to the network 30 and/or video source or sources 40 either directly or indirectly through one or more devices that operate in accordance with a wireless network protocol such as 802.11a,b,g,n (referred to generically as 802.11x), Bluetooth, Ultra Wideband (UWB), 3G wireless data connection, 4G wireless data connection or other wireless connection that operates in accordance with either a standard or custom interface protocol.

In operation, the command handler 100 coordinates the encoding and encryption processes with a client's requests for video content. For example, the command handler 100 receives a HTTP request for a selected one of the plurality of video programs from the at least one client device via the network interface 102. In response to the request, the selected one of the plurality of video programs is retrieved from the video source or sources 40, via the network interface. For example, the command handler can access the playlist data 112 to determine the universal resource identifier (URI) or other address for retrieving the selected one of the plurality of video programs from the video source or sources 40.

The command handler 100 retrieves the selected one of the plurality of video programs. A plurality of encoded segments are generated from selected video program, via a video encoder 104, at a selected bit rate. The video encoder 104 can include one or more encoders or transcoders that receive an encoded video program from the video source or sources 40 and that decodes and re-encodes or otherwise transcodes the audio and/or video of the program into the scale, resolution, and digital compression format, and at the selected bitrate for the requesting client device. In particular, the video encoder 104 can operate in accordance with a motion picture expert group (MPEG) format such as MPEG2, MPEG4 part 10, also referred to as H.264. Other video formats such as VC1, digital video (DV), etc., could likewise be employed. In an embodiment of the present invention, the video source or sources 40 contain unsegmented videos. Upon the client request of the first segment for a particular video and bitrate, the streaming video server 50 starts the retrieval of the video from the corresponding video source 40, and performs the encoding and segmentation. The segmentation can be done before or after the encoding, though it can be more practical to do the encoding first, then the segmentation.

Encrypted segments are generated from the encoded segments, via the video encryptor 106, based on an encryption key. The encrypted segments are then stored as video segments 116 that are then sent, via the network interface 102, as a streaming video signal to the at least one client device that requested the video program. The video encryptor 106 can operate in accordance with one or more cryptography algorithms such as data encryption standard (DES), Rivest, Shamir, Adelman (RSA), elliptical curve cryptography (ECC), Advanced Encryption Standard (AES) or other algorithm.

Streaming server module 50 includes an encryption key generator that generates the encryption key in response to the request. As discussed in conjunction with FIG. 1, the encryption key generator 108 generates encryption keys on-demand. This allows the keys to not be saved to a storage device, protecting the security of the key from being read without authorization. For increased content security, the keys can be generated randomly and are used for only one streaming session. In theory, while identical encryption keys could reoccur randomly, each encryption key is nevertheless practically or substantially unique to the request.

In an embodiment of the present invention, the rate data generator 220 generates rate data that indicates the selected bit rate. In operation, the rate data generator selects the bit rates based on channel information from network 30 pertaining to a communication channel between the network interface and the client device that generated the request. The channel information can include network bandwidth data, network utilization data, and/or other data including a channel type, expected bit rate, current actual bit rate, etc. As the bit rate is adjusted, the video encoder 106 encodes each current segment at the selected rate.

The command handler 100, video encoder 104, video encryptor 106, encryption key generator 108 rate data generator 220 and virtual file system 110 can be implemented via one or more processing devices and one or more memory devices. Such processing devices can include a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory. The memory can include a hard disc drive or other disc drive, read-only memory, random access memory, volatile memory, non-volatile memory, static memory, dynamic memory, flash memory, cache memory, and/or any device that stores digital information. Note that when the processing device implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

The streaming video server 50 has additional advantages over convention servers. The requirements for storage are reduced for the video segments, variant playlist, and playlists. This is especially important for embedded systems with limited storage capabilities. In addition, since the encryption process is performed on-demand like the encoding process, the key can be protected such that it can be accessed only by the intended client device, as opposed to all potential clients. Furthermore, the key itself can be changed while streaming is in progress, and this decision can be made during run-time as needed. These content protect features are especially important for premium content such as pay-per-view video. Further, the risk of unauthorized access to unencrypted video streams is reduced since they are never stored in encrypted or unencrypted form to a persistent storage device where they may be accessed by attackers. Also, live and pre-recorded video content can be handled differently. Streams from live sources will not suffer large delays.

FIG. 3 presents a block diagram representation of playlist data 112 in accordance with an embodiment of the present invention. FIG. 4 presents a block diagram representation of variant playlist data 114 in accordance with an embodiment of the present invention. In the example shown, playlist data 112 includes content index 120 a title of all available video selections from any of video sources 40, and a URI address for accessing the variant playlist data 114 for each program.

The content index does not have to be in a particular format, as long as the client devices and the streaming video server 50 use the same format or the formats can be translated to be compatible. Example formats include JSON, XML, plain text, etc. Other address formats could likewise employed including a file addressing scheme, an IP address, or other logical or physical addressing. In addition, the while specific video on-demand programs are presented, as previously discussed, live video programming could be retrieved, segmented, encoded and encrypted on demand for delivery in response to a client request.

In addition, playlist data 112 includes a segment playlist 122 for each video program and for each bitrate. Each segment playlist includes a segment number and address for each segment of the video program and optionally an address of an encryption key used for encrypting that particular segment. Again, while URIs are shown, Other address formats could likewise employed including a file addressing scheme, an IP address, or other logical or physical addressing.

The virtual file system also contains variant playlists for each video program in the content index. Each variant playlist includes an address (such as the URI shown) for the segment playlists, which are also contained in the virtual file system with a single entry.

In one example of operation, the streaming video server maintains playlist data 112 that includes a content Index that is served to the client upon its request. The streaming video server 50 can, for example, query each of the video sources 40 or its list of videos, then aggregate them to the create such a content index. The content index contains, for each item, the URI of the variant playlist. The client selects one item (e.g., via user input), then makes the HTTP request for the URI corresponding to that variant playlist for that item. The variant playlist contains the segment playlist URI for a single "phantom" bitrate, as shown in FIG. 4. As discussed in conjunction with FIG. 1, this forces the client to choose the single variant entry and eliminates the adaptation of the bit rate from the client side—in lieu of the server side adaptation of the bit rate. The client makes an HTTP request for the playlist (the only item on the list). The segment playlist contains the URIs for each segment's data and each segment's encryption key.

The URIs in the content index, variant playlist, and segment playlist do not correspond to actual files as in a traditional web server or streaming server that serves files stored on hard drive; the URIs are generated by the server and recognized as references to the virtual files when the client makes the HTTP request. This applies to the URIs for the lists themselves and also for the segment data and encryption keys. When a request is received for a "file" in the virtual file system, the server generates the appropriate response depending on the actual request. For example, (a) responding with the content index, variant playlist, segment playlist data using information stored in memory, (b) generating a random encryption key, storing it to memory (for subsequent segment requests), and sending it in the response to the client, (c), initiating video transfer from a source, initiating the encoding and segmentation, sending the first segment in the response to the client, (d) for a previously initiated transfer, encoding and segmentation, return the next segment to the client. As shown the variant playlist data includes only a single entry for a particular title, a group of titles, for all programs from a particular video source 40 or from all video sources.

The streaming video server 50 provides additional advantages over a conventional HLS-based server system. Multiple video encoders 104 can be present in order to meet the simultaneous use requirements of on-demand transcoding for multiple client devices. The encoded data is generated on as-needed basis and reducing the need for persistent storage. Encryption keys can be generated on an as-needed basis and never stored except temporarily in volatile memory, also saving storage. By not storing encoded data and encryption keys, content security is improved. Also, live and pre-recorded content can be handled differently, resulting in improved user experience.

A conventional HLS-based server system must store the video for all bitrate settings. The requirement for storage capacity grows with the number of bitrate settings and duration of the video. The data must be stored even though it may never be requested by the client, because it can't be absolutely determined at encoding time which particular segments will be used by the clients. In the present system, the data resulting from video transfer from a video source 40, encoding, key generation, and encryption are not stored to persistent storage (e.g. a hard drive). Transfer, encoding, segmentation, and encryption on a source video can be deferred until that video is requested by the client.

In addition, in a conventional HLS-based server system, the bitrates for the video must be set before the encoding process starts. Some knowledge of the expected network capacity and playback device types is required in order to select the appropriate bitrates. Typically, three bitrates are used: one low bitrate setting of approximately 64 kbps, and two higher settings between 100 and 500 kbps. Setting the bitrates at encoding time means that the target use cases are also set. Any unexpected cases (e.g., very high network capacity, a new client device) are not addressed. When the video segments are encrypted, an encryption key must be selected that is to be used by all clients.

In contrast, the streaming video server 50 can employ adaptive bitrates without having to encode and store the encoded and encrypted video segments for an entire program at all of those bitrates prior to streaming. In an embodiment of the present invention, prior to streaming, little needs to be known about the client device and the possible network conditions. In addition, since bitrate settings are adjusted to adapt to current conditions adjustments and generated on the fly, these adjustments can be made with a fine granularity over the full range required. This reduces the distracting effect of the video and audio quality changing greatly from one segment to the other due to a large change in bitrate. More importantly, the adaptive bitrate feature allows the network usage to be optimized for the current conditions. That is, it is more likely that the selected bitrate is the maximum allowed by the network connection between the server and client, thus maximizing the video and audio quality for the end user.

Figure 5:
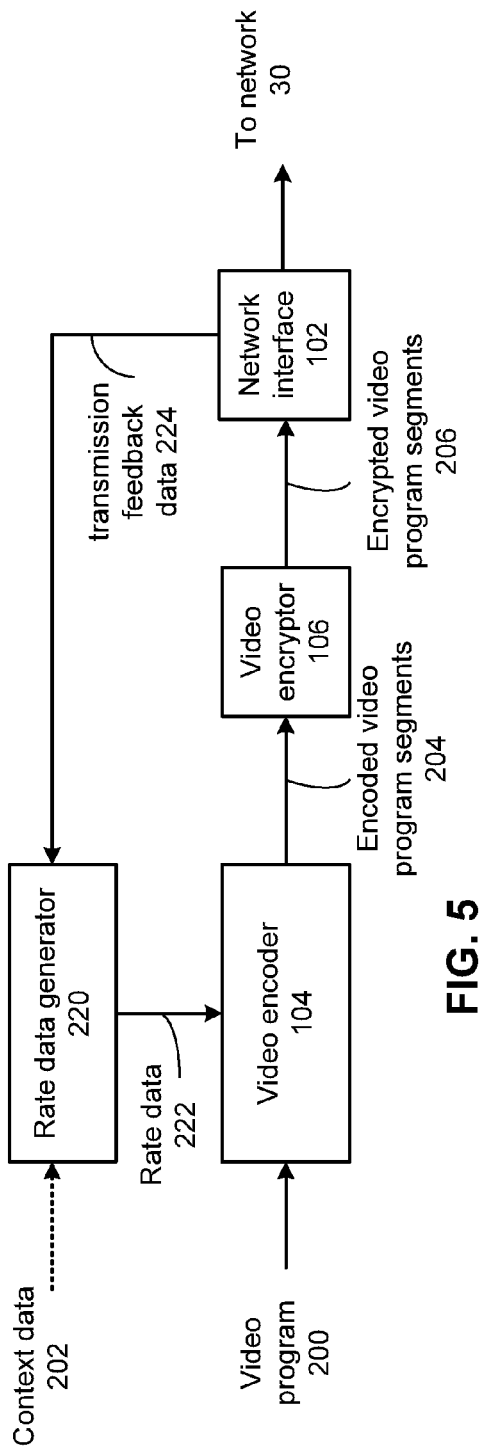
FIG. 5 presents a block diagram representation of an encoder 104 in accordance with an embodiment of the present invention.

FIG. 5 presents a block diagram representation of an encoder 104 in accordance with an embodiment of the present invention. In this embodiment, the video encoder 104 encodes the selected video program 200 into encoded video program segments 204. Video encryptor 106 encrypts the encoded video programs segments 204 into encrypted video program segments 206 based on an encryption key, such as a key from encryption key generator 108. The encrypted video program segments 206 are transmitted over network 30 via network interface 102. In operation, rate data generator 220 generates rate data 222 based on transmission feedback data 224 from the network interface 102 that reflects the channel conditions. Transmission feedback data 224 can also include data from the client device 60, 62, 64, 66 or 68 that indicates information regarding that client device. Examples of such client data includes a current one of a plurality of device states, such as a client device operating system, video display window size (minimized, partial or full screen) or a volume setting that can be used to adjust the video resolution, or audio encoding depth, the number of audio channels or be used to decide whether to or not to include audio information in the stream. The rate data 222 can also be optionally based on context data 202 that relates to the content of the video program 200. The context data 202 can indicate information derived from the video program 200 or the video source 40 such as the genre of video (e.g., news, sit com, music, cartoon, video conference), the number of audio channels and/or other information regarding the characteristics, properties or format of the video program 200.

The video encoder 104 encodes the video program segments based on one or more encoding parameters that are adjusted in response to rate data 222 that relates to the streaming session for the selected video program.

As discussed in conjunction with FIG. 2, video encoder 104 can operate in accordance with a motion picture expert group (MPEG) format such as MPEG2, MPEG4 part 10, also referred to as H.264. Other video formats such as VC1, digital video (DV), etc., could likewise be employed. In an embodiment of the present invention, the video program 200 can be segmented before or after encoding. Video encoder 104 can be implemented via one or more processing devices and one or more memory devices. Such processing devices can include a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory. The memory can include a hard disc drive or other disc drive, read-only memory, random access memory, volatile memory, non-volatile memory, static memory, dynamic memory, flash memory, cache memory, and/or any device that stores digital information. Note that when the processing device implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

In operation, the streaming server 50 responds to the segment requests by encoding the source content at the selected bitrate. The encoding process is performed on-demand, therefore the encoding parameters can be adjusted to conform with the rate data 222 that reflects the conditions of the current streaming session. In response to the rate data 222, the video encoder 104 can adaptively choose or otherwise adjust the overall average bitrate of a segment, and for a selected overall average bitrate, the average bitrate of the audio content and the average bitrate of the video content. In addition, the video encoder 104 can adaptively choose or otherwise adjust other encoding parameters such as the output video resolution, the output video frame rate, the number of encoded audio channels, etc.

Figure 6:
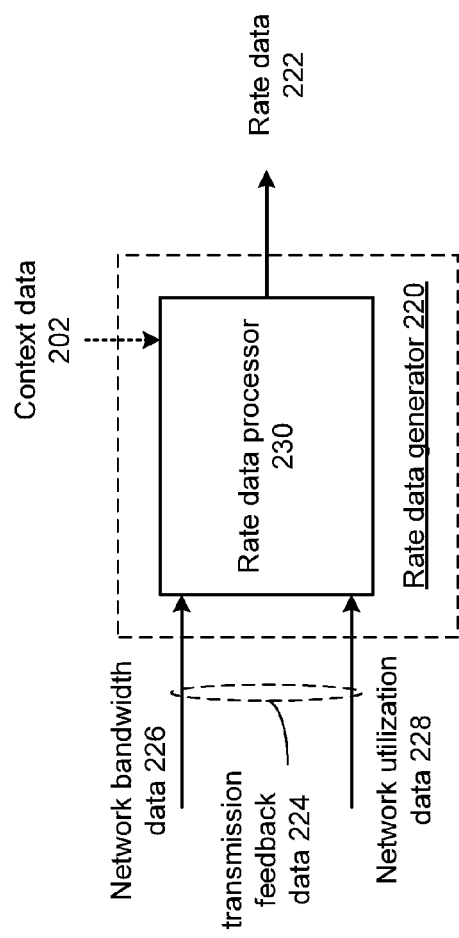
FIG. 6 presents a block diagram representation of a rate data generator 220 in accordance with another embodiment of the present invention.

FIG. 6 presents a block diagram representation of a rate data generator 220 in accordance with another embodiment of the present invention. In particular, rate data generator 220 includes a rate data processor 230 that operates based on transmission feedback data 224 and optionally based on context data 202 to generate rate data 222. The rate data processor 230 can be implemented via one or more processing devices and one or more memory devices. Such processing devices can include a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory. The memory can include a hard disc drive or other disc drive, read-only memory, random access memory, volatile memory, non-volatile memory, static memory, dynamic memory, flash memory, cache memory, and/or any device that stores digital information. Note that when the processing device implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

In an embodiment, the rate data processor 230 operates based on transmission feedback data 224 that includes network bandwidth data 226 and network utilization data 228. Network bandwidth data 226 represents a number of bytes per second transferred over the network connection. For example, this quantity can be calculated based on an average number of bytes sent to the client in the last 15 seconds. It can be measured in bytes per second and calculated as a running average such as an unweighted average, an exponentially weighted moving average, a filtered average or other mean, median or other average. Network utilization data 228 can be calculated based in the percentage of time spent in data transmission in a particular second—i.e. what part of that second the network interface 120 was busy with sending data to network 30. For example, this quantity can be calculated based on by measuring the amount of time spent in a socket write( ) function during each second. Spending 500 ms of a particular second in writing data to the channel yields a 50% utilization.

The rate data 222 can be calculated based on the value of the variable "bitrate" in the following algorithm.

```
if ( aUtilization < mTargetUtilization )
{
    // try to speed-up
    if ( aUtilization < 10 )
    {
        // less than 10% utilization is not reliable, try to use
double rate than the current speed
        bitrate = aSpeed * 2;
    }
    else
    {
        realSpeed = aSpeed * 100 / aUtilization;
        bitrate = realSpeed * mTargetUtilization / 100;
    }
}
else
{
    // try to slow down
    bitrate = aSpeed * mTargetUtilization / aUtilization;
}
``` where aUtilization and aSpeed are current network utilization (network utilization data 228) and current network speed (network bandwidth data 226) and mTargetUtilization is a maximum percentage of the total reachable bandwidth which could be used for transmission streaming data. Reserving some amount to account for errors in bitrate calculation, and for different overheads such us HTTP headers etc., mTargetUtilization can be set at 90% or other limit.

In addition, to the algorithm above, the rate data processor 230 can adjust the data rate 222 based on a minimum data rate. In particular, the HLS protocol prohibits changing of any parameters of the stream. Particularly, if the stream contained both video and audio, each of its segments of any bitrate should always contain both video and audio disregarding of how low the bitrate is. Moreover, the audio parameters, including the bitrate, stay the same for all bitrates for current stream. Therefor the lowest reachable bitrate may be limited based on the bit rate required to send the audio track. As the video track couldn't be completely removed, in an embodiment, to get as close to the audio bitrate as possible, the encoded video program segments can be replaced with a still image of the video program 200, a standard still image or other still image. A bitrate of such a video stream should be close to zero, which makes the total bitrate of the stream equal to audio bitrate.

At the beginning of a video program, the rate data generator can adjusts the data rate 222 based on an initial data rate that starts the stream at the first segment. The initial data rate can be fixed as a nominal data rate, estimated based on partial transmission feedback data 224 and/or generated based on context data that indicates properties of the selected one of the plurality of video programs.

While the rate data 222 can be generated as described above, other techniques can likewise be employed. The rate data 222 be generated based on a bandwidth assessment or other bandwidth test performed in response to the request for the selected video program 200. A channel bandwidth test can be performed prior to transmission of the first segment. For example, prior to requesting the first segment, the client device 60, 62, 64, 66 or 68 can request a URI that is specifically used to perform the channel bandwidth test. The streaming server 50 recognizes this request and responds with a test signal to the requesting client device. The transfer rate of the test signal can be measured by the streaming server 50. For example, the response to the variant playlist request can be padded with content that is to be ignored by the requesting client device (normal variant playlist content still exists). This can be done by placing whitespace characters at the end, or inserting lines that start with the comment character '#'. The amount of data can be chosen so the total size of the variant playlist is suitable for a channel bandwidth test while reducing the time delay in starting the playback of the selected video program to the user. Using too much data could slow the user experience, while using too little data could reduce the accuracy of the test result. The transfer rate of the variant playlist is measured by the streaming server 50.

Figure 7:
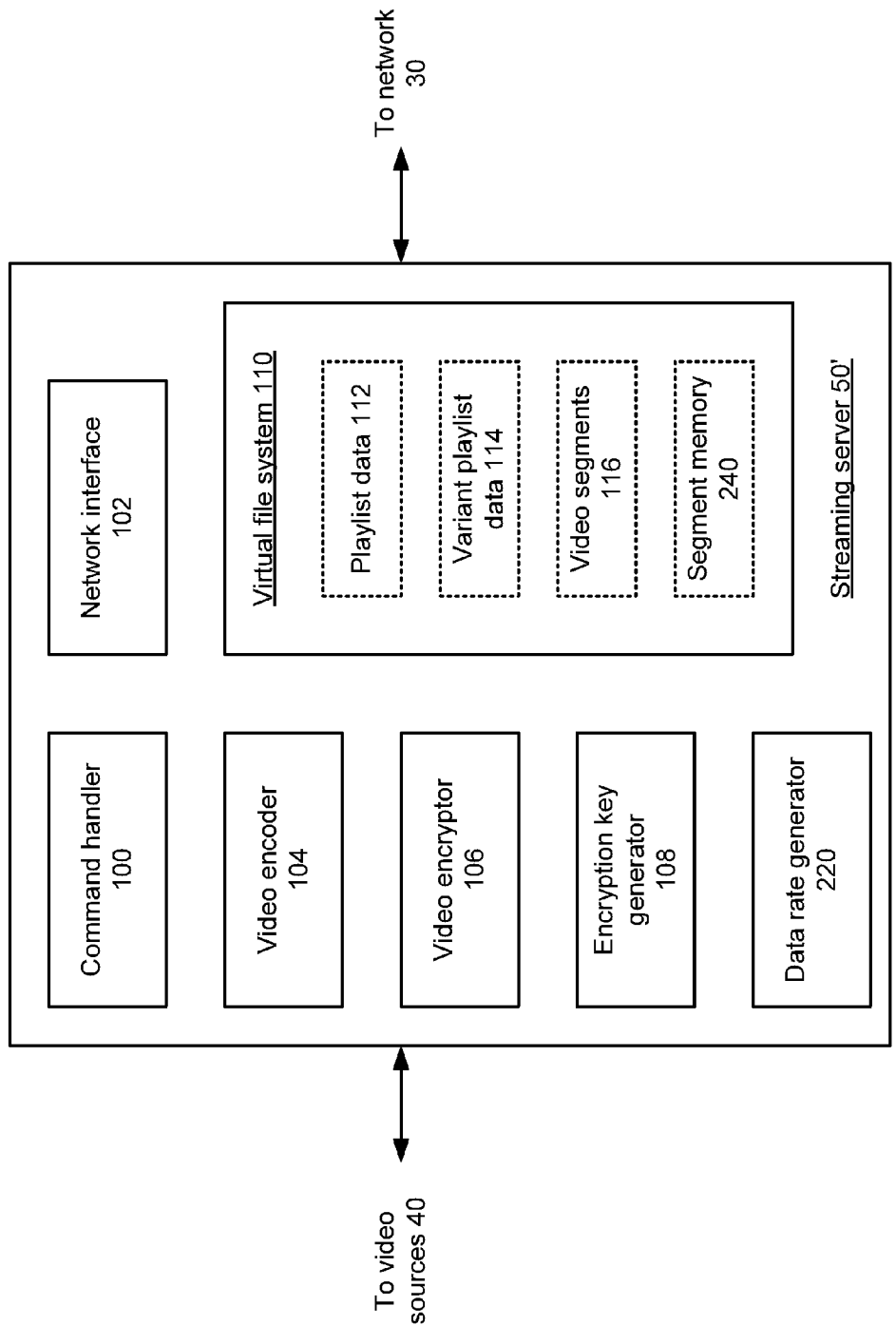
FIG. 7 presents a block diagram representation of streaming server 50' in accordance with an embodiment of the present invention.

FIG. 7 presents a block diagram representation of streaming server 50' in accordance with an embodiment of the present invention. In particular, a streaming server 50' is presented that operates in a similar fashion to streaming server 50 and that includes many similar elements to streaming server 50 that are referred to by common reference numerals. Streaming server 50' includes a segment memory 240 that includes one or more initial video program segments for each title in the content index that can be used to initialize the video stream when the first video segments are being produced. This reduces the latency period of the stream—speeding up the time to transmission of the first segments since there is no need to wait for encoding or transcoding—these initial segments can be retrieved directly from the segment memory. Further details of this configuration including optional functions and features will be described in conjunction with FIGS. 8 and 9 that follow.

FIG. 8 presents a block diagram representation of an encoder 104 in accordance with an embodiment of the present invention. A similar structure is presented to FIG. 5 that includes many similar elements that are referred to by common reference numerals. This configuration includes a segment memory 240 that stores one or more stored initial video program segments for each video program in the content index. When a particular video program 200 is requested, the initial segment or segments of the stream can be retrieved from the segment memory 240 as stored initial program video segments 242 that are passed by multiplexer 244 to video encryptor 106. At the same time that these stored initial video program segments 242 are being retrieved, the video encoder 104 can begin encoding or transcoding the video program 200 to generate encoded video program segments 204. In an embodiment, the video encoder 104 begins the production of encoded video program segments 204 at a point in time before a request for the corresponding segment arrives. In this fashion, if/when the request for the segment arrives, the video encoder 104 is prepared. In this configuration, a buffer of the video encoder 104 (not expressly shown) is used to store the encoded video segment 204.

The multiplexer 244 can switch the stream from the stored initial video program segments 242 to the encoded video program segments 204 when the stored initial video program segments 242 are exhausted. In other mode of operation, the multiplexer 244 can switch the stream from the stored initial video program segments 242 to the encoded video program segments 204 when the first encoded video program segments 204 is complete and corresponding prior segment from the stored initial video program segments 242 has been passed to the video encryptor 106.

FIG. 9 presents a temporal diagram representation of program segments in accordance with an embodiment of the present invention. In particular, a plurality of segments (001-009) of a video program that are output from the multiplexer 244 are shown. In this example when a request for a first segment (001) of a particular video program arrives the video encoder 104 begins the production of encoded video program segments 204 beginning at segment (004)—at a point in time before a request for the segment (004) arrives. The multiplexer 244 begins feeding the first three segments (001-003) of the video program as the stored initial video program segments 242 during the time the encoder 104 is initializing. By the time the last stored segment (003) is passed to the video encryptor 106, the next segment (004) is ready from the video encoder 104 and when a request for the segment (004) arrives, the multiplexer 244 can switch to the encoded video program segments 204.

In the example shown, the multiplexer 244 generates output segments to the video encryptor as the initial video program segments (001-003) during an initial latency period of the video encoder in producing a first encoded video segment (004)—the next segment in a temporal sequence of the video program segments. Said another way, the initial video program segments (001-003) cover an initial temporal period of a selected video program corresponding to an initial latency period of the video encoder 104 in producing a first segment of the encoded video segments (004).

The number of stored initial program segments 242 can be selected based on their duration to cover or more than cover any such latency period. In the example described above, segments (004-005) may also be stored in the segment memory 240 for use if necessary, depending on the selected encoding bit rate. If a video segment is requested by the client device that has already been encoded and the corresponding stored initial video program segment has not been sent, the multiplexer 244 can switch to sending the encoded video program segment corresponding to the request in lieu of the stored initial video program segment of this number.

It should also be noted that transmission feedback data 244 can be generated during the transmission of the stored initial video program segments in order to more quickly generate meaningful rate data 222.

Figure 10:
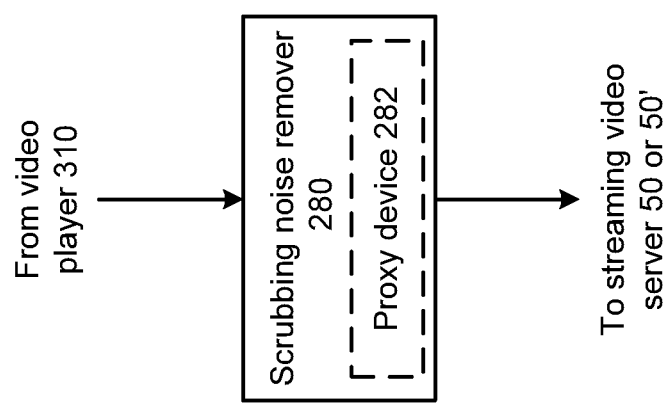
FIG. 10 presents a block diagram representation of scrubbing noise remover 280 in accordance with an embodiment of the present invention.

FIG. 10 presents a block diagram representation of scrubbing noise remover 280 in accordance with an embodiment of the present invention. During scrubbing, a video player 310, such as a video player of a client device 60, 62, 64, 66 or 68 may send a number of "spurious" content requests. For instance, if a user wants to jump from a segment #40 which is a segment which is begin currently played to a segment #100, the following sequence of requests can be generated.

..., #38, #39, #40, #45, #73, #60, #100, #101, #102, ...
Depending on the implementation of the video player 310 and/or streaming video server 50 or 50', serving of these spurious requests may be time consuming. For instance, a reseeking of the current position of playing may take much time. In the example above, the requests for each of the segments #45, #73, #60, #100 would demand reseeking.

A scrubbing noise remover 280 is shown that includes a proxy device 282, such as client-side proxy or a server-side proxy, that operates to identify and remove intermediary requests during scrubbing. One side of the proxy device 282 is connected to a remote streaming server, such as streaming video server 50 or 50' or other streaming server. The other side of the proxy device 282 is connected via an HTTP connection to a video player, such as an HLS player or other video player of a client device 60, 62, 64, 66 or 68. In this configuration the proxy device 282 is connected between the client device and the streaming video server 50 or 50' and communicates with each device via a device interface that emulates the other device. In this fashion, the proxy device 282 appears as a video player when communicating with the video server 50 or 50' and appears as a video server 50 or 50' when communicating with the video player of client device 60, 62, 64, 66 or 68. Commands, requests and data that pass through the proxy device 282 can be identified and passed through, or translated, intercepted, held or otherwise modified.

In operation, the proxy device 282 intercepts a request from the video player to the streaming video server for one or more scrubbing segments of the video program being played, and in response, sends a corresponding fixed segment, such as an empty segment, single pre-stored segment or other fixed segment to the video player. The proxy device 282 passes a request from a video player of a client device such as client device 60, 62, 64, 66 or 68 to the streaming video server 50 or 50' for non-scrubbing segments of video program. In this fashion, the proxy device identifies spurious requests and ignores them, returning an empty or fixed segment instead of actual content. Only when a sequence of requests stabilizes will the proxy device 282 pass the requests to the server 50 or 50' to provide media content.

In an embodiment, the proxy device 282 identifies scrubbing segments and non-scrubbing based on a comparison of the position of a segment and to the position of an immediately preceding requested segment. The proxy device 282 identifies a scrubbing segment when the position of the segment and compares unfavorably to the position of the immediately preceding requested segment, for example, when the segment falls out of sequential order. Similarly, the proxy device 282 identifies a non-scrubbing segment when the position of the segment and compares favorably to the position of the immediately preceding requested segment, for example, when the segments are in sequential order. For instance, proxy device 282 can use a decision criterion of whether two consecutive content requests are in a sequential order. In the example presented above, segments #45, #73, #60, #100 can be identified as scrubbing segments with non-scrubbing segments being #38, #39, #40, #101, #102. While this criteria results in segment #100 as being a scrubbing segment, buffering these requests in the proxy device 282 allows a look-forward criteria to be applied—identifying segments #45, #73, #60, as scrubbing segments with non-scrubbing segments being #38, #39, #40, #100, #101, #102.

In addition to identifying scrubbing and non-scrubbing segments basing on whether their numbers be sequential or not, the proxy device 282 can apply alternative or additional criteria to qualify a segment as non-scrubbing. For example, the proxy device 282 can also analyze the incoming segment requests merely presence of new requests while the older one is being analyzed in addition to the sequence-based analysis described above. Consider the sequence of requests below:

1 #2 #20 #30 #100 #101 #102

Applying the sequence based methodology would identify the segments #1, #2 as non-scrubbing, #20, #30, #100 as a scrubbing, #101 segment as a first non-scrubbing in a new sequence basing on the fact it is sequential relative to #100. Proxy device 282 can also implement an additional heuristic criterion (not for any non-scrubbing segment, but just for the potential head of non-scrubbing sequence) by saying that:

1. At the time the request is analyzed, there may be no new buffered request and then even if this criteria is true:
2. wait for 1 second and then recheck the criterion that no new buffered request is present still.

The usage of these criteria is based (and is dependent) on the fact that a client does not issue multiple requests (unless scrubbing is done), that is if a client has issued a request for #101 segment and it still wants to get its content, it would not issue an additional request for a new segment #102 until it gets the #101 segment. In the example above, #101 would be qualified as a non-scrubbing sequence, if the new request for segment #102 was not received prior to or during the 1 second waiting interval. In this fashion, the proxy device 282 effectively puts new requests into sequential queue and analyzes them on FIFO manner one by one. While a request is being processed, there may be evaluated a condition whether new requests are present in the queue in the same moment.

Then, the presence of a new request while #101 request is evaluated for being a scrubbing segment or not plays as an additional criteria to identify it (#101) as "noise". If there is no new segment while #101 is analyzed, even after 1 sec delay, then the proxy device 282 can decide that #101 is not noise and restart a new sequence of playback.

As discussed above proxy device 282 operates to intercept, pass or otherwise filter requests for content from the video player 310 of a client device to a streaming video server, such as streaming video server 50 or 50'. The video player 310 operates in response to commands of a user received via a user interface such as a touch screen, remote control device or other device by generating a program request to the streaming server 50 or 50' for a selected video program that is sent to the streaming server via the network interface 102. The proxy device 282 can be an HLS proxy server deployed on the client device or other the streaming video server 50 or 50'. One side of the proxy device is connected to the remote streaming server, such as streaming video server 50 or 50. The other side of the proxy device is connected to the video player 310, such as an HLS player or other video player, via an HTTP connection. Whether local to the client device, the streaming server 50 or 50' or arranged between these two devices, the proxy 282 is connected between the video player 310 and the streaming video server 50 or 50'.

The scrubbing noise remover 280 and proxy 282 can be implemented via one or more processing devices and one or more memory devices. Such processing devices can include a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory. The memory can include a hard disc drive or other disc drive, read-only memory, random access memory, volatile memory, non-volatile memory, static memory, dynamic memory, flash memory, cache memory, and/or any device that stores digital information. Note that when the processing device implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

Figure 11:
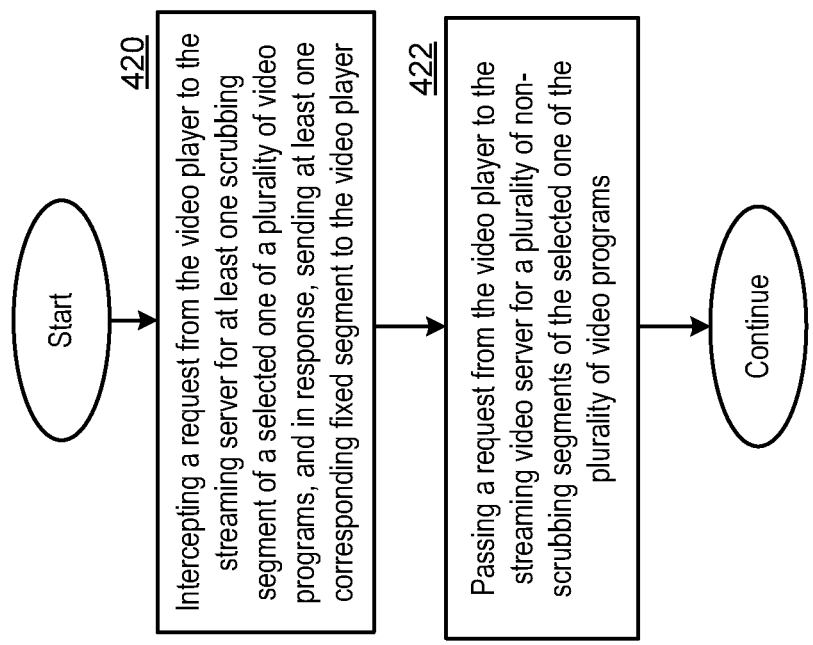
FIG. 11 presents a flowchart representation of a method in accordance with an embodiment of the present invention.

FIG. 11 presents a flowchart representation of a method in accordance with an embodiment of the present invention. In particular a method is shown for use in conjunction with one or more functions and features described in conjunction with FIGS. 1-10. Step 420 includes intercepting a request from the video player to the streaming video server for at least one scrubbing segment of the selected one of the plurality of video programs, and in response, sending at least one corresponding fixed segment to the video player. Step 422 includes passing a request from the video player to the streaming video server for a plurality of non-scrubbing segments of the selected one of the plurality of video programs.

In an embodiment, the at least one scrubbing segment of the selected one of the plurality of video programs is identified based on a comparison of a position of the at least one scrubbing segment and to a position of at least one immediately preceding requested segment of the selected one of the plurality of video programs. The at least one scrubbing segment of the selected one of the plurality of video programs can be identified when the position of the at least one scrubbing segment and compares unfavorably to the position of at least one immediately preceding requested segment of the selected one of the plurality of video programs. The plurality of non-scrubbing segments of the selected one of the plurality of video programs can be identified based on a comparison of positions of the plurality of non-scrubbing segment and to positions of corresponding immediately preceding requested segments of the selected one of the plurality of video programs. The plurality of non-scrubbing segments of the selected one of the plurality of video programs can be identified when the positions of the plurality of non-scrubbing segment compare favorably to the positions of the corresponding immediately preceding requested segments of the selected one of the plurality of video programs. The at least one scrubbing segment can include a plurality of scrubbing segments. The proxy device can identify the plurality of non-scrubbing segments of the selected one of the plurality of video programs by further evaluating a candidate non-scrubbing sequence based on when a new segment request has been received. The at least one corresponding fixed segment can be an empty segment.

Figure 12:
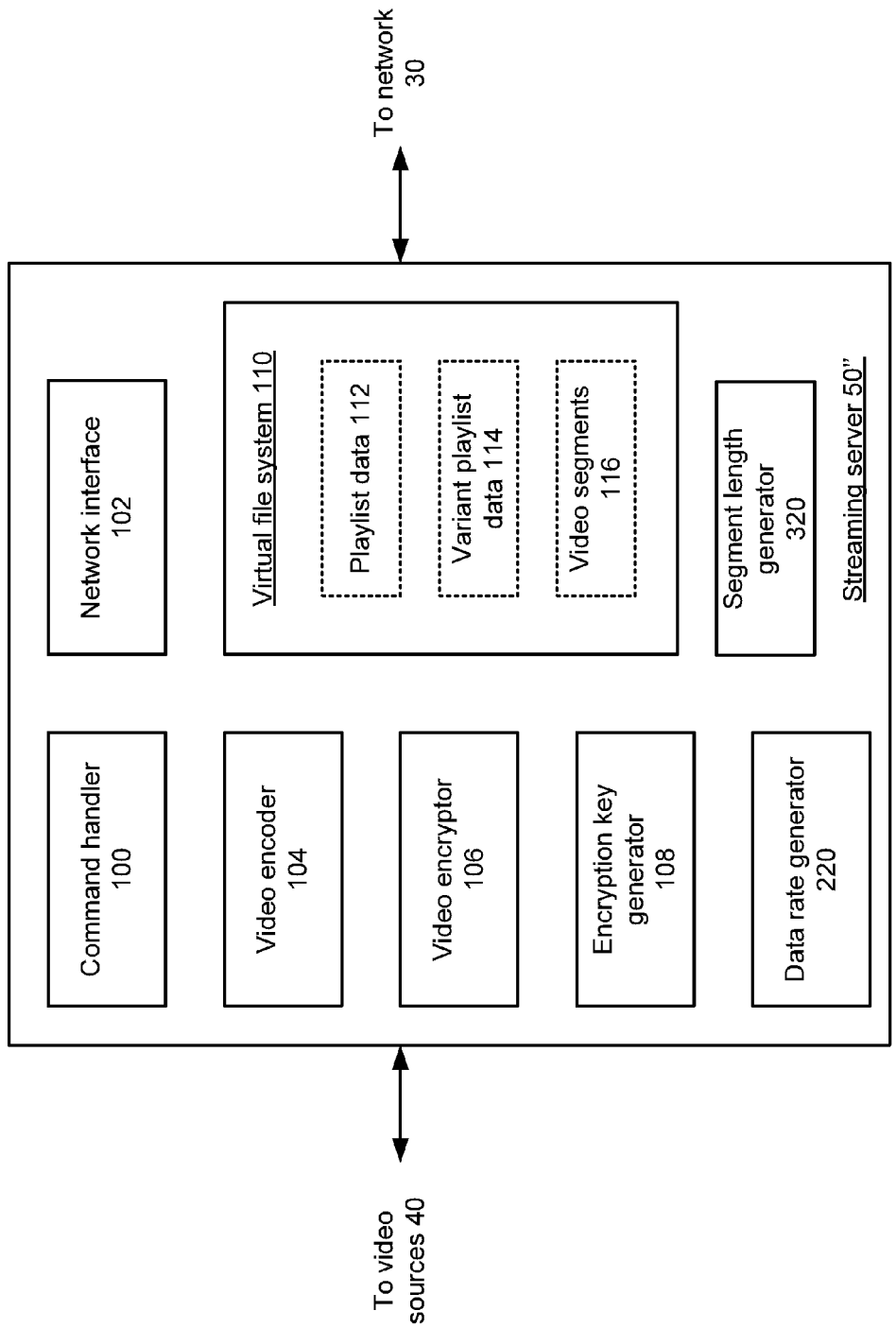
FIG. 12 presents a block diagram representation of streaming server 50" in accordance with an embodiment of the present invention.

FIG. 12 presents a block diagram representation of streaming server 50" in accordance with an embodiment of the present invention. In particular, a streaming server 50" is presented that operates in a similar fashion to streaming server 50 and that includes many similar elements to streaming server 50 and 50' that are referred to by common reference numerals. In particular, the streaming server 50" includes methodologies that can be used in addition to or as an alternative to the streaming server 50' to reduce latency during start up. Streaming server 50" operates to dynamically control the length of video program segments generated by a video encoder such as video encoder 104, based on length data generated by a length data generator 320.

Further examples including several optional functions and features are described in conjunction with FIGS. 13-18 that follow.

Figure 13:
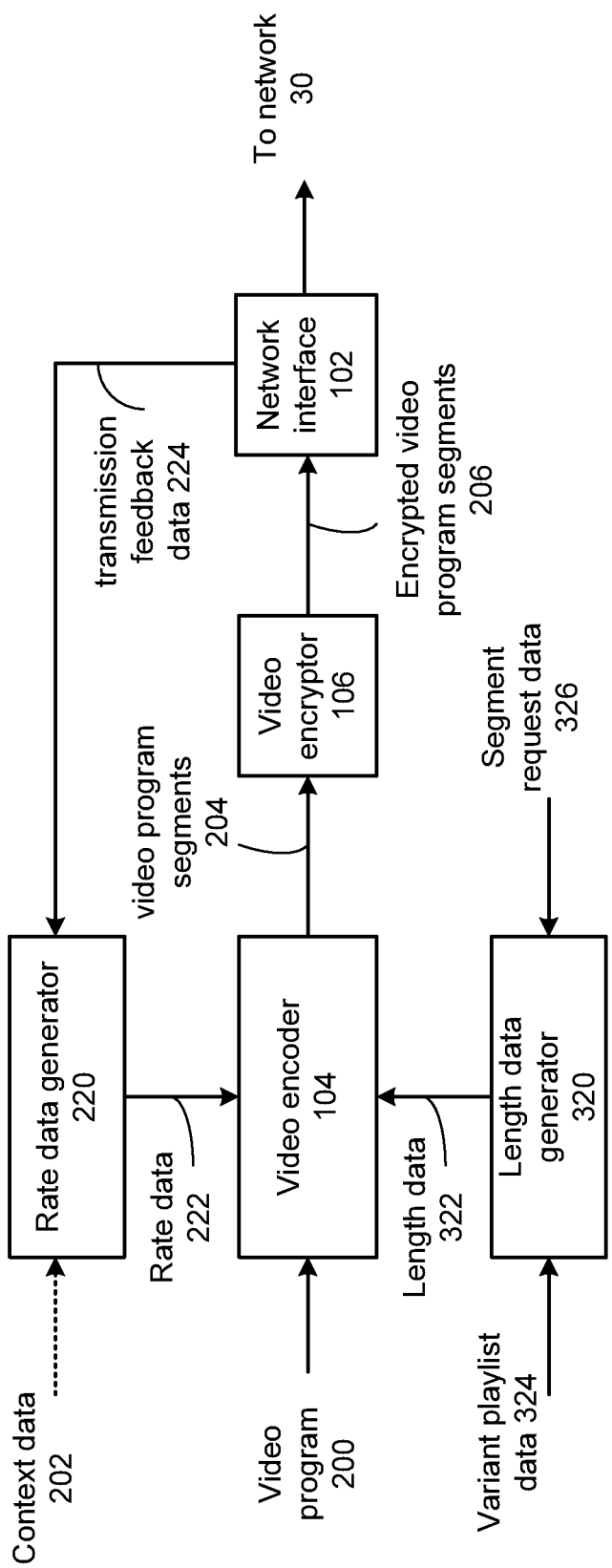
FIG. 13 presents a block diagram representation of an encoder 104 in accordance with an embodiment of the present invention.

FIG. 13 presents a block diagram representation of an encoder 104 in accordance with an embodiment of the present invention. A similar structure is presented to FIG. 5 that includes many similar elements that are referred to by common reference numerals. This configuration includes the length data generator 320 that generates the length data 322 based on variant playlist data. Video encoder 104 operates to dynamically control the length of video program segments 204, based on this length data 322.

During initialization of the streaming video server 50" after receiving a new request for a video program 200, one or more initial video program segments 204 can be generated with at least one initialization length that is less than a steady state length used when video encoder 104 reaches steady state—after initialization is complete. When a plurality of initial video program segments are employed, the at least one initialization length can include a single reduced length or different lengths such as a plurality of monotonically increasing lengths that are each less than the steady state length In operation, the length data generator 320 generates the length data 322 based on variant playlist data 324 that indicates the desired length of these initial segments. For example, the variant playlist data can specify a small initial length of the first video program segment 204 and allow the length to ramp up to a steady state length when initialization is complete.

Consider the following example where the streaming video server 50" provides streaming video program segments 204 in accordance with the HLS protocol. Consider also that the encoding/transcoding performed by video encoder 104 has a non-trivial delay at the start of the streaming session due to internal processing required to begin retrieving, segmenting and encoding/transcoding the video program for transmission to the requesting client device. Further consider that the video encoder 104 operates at an encoding/transcoding speed that is faster than real-time—allowing the video program segments 204 to be generated on the fly in response to a new request for a video program. In HLS, the length of each of the video program segments 204 is specified in the variant playlist data playlist generated by the virtual file system 110. Each video program segment 204 has a corresponding entry in the variant playlist that includes a segment length. Different video program segments 204 can have different lengths.

The algorithm addresses the latency at the beginning of the streaming session by delivering short initial segments and then gradually increasing the segment length until a steady state length is reached.

1. Deliver the first two segments with a minimum length. This minimum length, such as 1 second, can be chosen to reduce the latency until the first segment is generated and delivered while maintaining a reasonable segment overhead.
2. Gradually increase the segment length for each consecutive segment while keeping a margin for the delivery.

For example if the encoding/transcoding speed is 2× (twice real time)—in theory after a 1 second segment the video encoder 104 can be switched immediately to a 2 second segment. A margin for delivery can be maintained by increasing the segment length by a factor below the actual encoding rate of 2×. An increase rate of 1.5× can be selected. In this fashion, the length of the next segment can be controlled to be 1.5 seconds.

In one example of operation and considering the segment length for segment x is L(x) and the steady state length is L(target), where the length is a value larger than the initial segment length, such as 10 seconds:

L(1)=1;
L(2)=1;
L(x+1)=MAX(L(x)*(1×M)*T, L(target));

Also consider the encoding/transcoding speed is T (1.5 means 1.5 times real-time) and the required margin is M (in seconds, e.g. 0.1). In a further example, during initialization, the length data generator 230 generates length data 322 as L(x) as follows:

| x | L(x) |
|---|---|
| segment #1 | 1 second |
| segment #2 | 1 second |
| segment #3 | 1.5 seconds |
| segment #4 | 2 seconds |
| segment #5 | 3.5 seconds |
| segment #6 | 6 seconds |
| segment #7 | 10 seconds |
| segment #8 | 10 seconds |

Further segments continue in steady state condition with the steady state/target length of 10 seconds. The variant playlist data 324 for each video program segment 204 reflects the actual length of the segment during initialization and reflects a playlist length of 10 seconds for all subsequent video program segments. This ensures the synchronization between the streaming video server 50" and the video player of the client device.

In addition to controlling the length of video program segments 204 during initialization, similar techniques can be employed to the generation of video program segments 204 when video streaming is reinitialized after either a stop, pause or scrubbing operation of the video player of the client device. In this case, the video encoder 104 must also begin encoding or transcoding the video program 200 to generate encoded video program segments 204 that begin at a new seek position or a restart position, before these segments can be streamed. While the streaming video server 50" can generate a playlist with different segment sizes during initialization, in case of a seek or restart, the playlist may already be published or reside on the video player and cannot be changed to reflect new segment sizes. In this case, the length data generator 320 can operate by delivering one or more short initial segments and then one or more segments with increased length until it is in sync with the original playlist.

In operation, the length data generator 320 detects a steady state condition or a reinitialization condition based on review of the segment request data 326. The steady state condition is characterized by the segment numbers being requested in sequence. As given in the scrubbing examples presented in conjunction with FIG. 10, the reinitialization condition is characterized by the beginning of a new sequence at a seek position that is discontinuous to a prior sequence. In the steady state condition, the length data generator 320 generates the length data 322 for these steady state video program segments as a corresponding playlist length indicated by the variant playlist data 324. When a reinitialization condition is detected, the length data generator 320 can respond to the reinitialization by setting the length data 322 at the beginning of new sequence at reduced values that do not match to the segment lengths previously published in the variant playlist. In this case the player and the player controls (scrubbing bar) will be out-of-sync, but the playback will still be smooth.

In operation, the length data generator 320 detects a reinitialization condition based on the segment request data 326 and generates the length data 322 for at least one reinitialization video program segment as at least one first reinitialization length that is reduced from the corresponding playlist length. In order to regain synchronization, the length data generator 320 generates first accumulation data that represents an accumulated difference between the reinitialization lengths and the corresponding playlist lengths for the first video program segment or segments. The length data generator 320 then generates the length data 322 for at least one second reinitialization video program segments as at least one second reinitialization length that is increased from the corresponding playlist length—in order to make up the time it lost by reducing the length of the first video program segment or segments. In particular, the length data generator 320 generates second accumulation data that represents an accumulated difference between the at least one second reinitialization length and the corresponding playlist length for the second reinitialization video program segment or segments, and returns to the steady state condition when the second accumulation data compares favorably to the first accumulation data. In this fashion, the total amount of time lost in reducing the length of the first reinitialization video program segment or segments can be compensated for by increasing the lengths of the second reinitialization video program segment or segments by this exact amount.

The algorithm begins in the same fashion as the beginning of a new program:

L(n)=1; (seek position)
L(n+1)=1; (seek position+1)

However, because the lengths set in the seek position do not match the variant playlist data originally published by the streaming server 50", the seek operation requires extra attention to not leave the client user interface out-of-sync of the video stream. If the original segment length was 10 seconds, but the streaming video server 50" delivers only one second of video, the user interface will be 9 seconds off. To compensate for this difference, the error for each segment is accumulated, and additional longer segments are generated to bring the streaming video server 50" and the video player of the client device back into synchronization.

SumError=2*L(target)-1-1;
Then,
L(x+1)=MAX(L(x)*(1×M)*T, L(target)+SumError);
If L(x+1)<L(target), add L(target)-L(x+1) to SumError
If L(x+1)>L(target), subtract L(x+1)-L(target) from SumError Consider the following example where the streaming video server 50" provides streaming video program segments 204 in accordance with the HLS protocol. The encoding/transcoding performed by video encoder 104 has a non-trivial delay in reinitializing a stream to a new seek position due to internal processing required to begin retrieving, segmenting and encoding/transcoding the video program for transmission to the requesting client device. Further the video encoder 104 operates at an encoding/transcoding speed that is faster than real-time—allowing the video program segments 204 to be generated on the fly in response to a new seek position for a video program. Considering the segment length for segment x is L(x) and the steady state length is L(target), where the length is a value larger than the initial segment length, such as 10 seconds. Also consider the encoding/transcoding speed is T (1.5 means 1.5 times real-time) and the required margin is M (in seconds, e.g. 0.1). During initialization, the length data generator 230 generates length data 322 as L(x) as follows:

| x | L(x) |
|---|---|
| segment #1 | 1 second |
| segment #2 | 1 second |
| segment #3 | 1.5 seconds |
| segment #4 | 2 seconds |
| segment #5 | 3.5 seconds |
| segment #6 | 6 seconds |
| segment #7 | 10 seconds |
| segment #8 | 10 seconds |

Further segments continue in steady state condition with the steady state/target length of 10 seconds. The variant playlist data 324 sent to the client device reflects a playlist length of 10 seconds for all subsequent video program segments. After a seek operation to position y:

| x | L(x) |
|---|---|
| segment #y | 1 second (missing: 9 seconds) |
| segment #y + 1 | 1 second (missing: 9 seconds) |
| segment #y + 2 | 1.5 seconds (missing: 8.5 seconds) |
| segment #y + 3 | 2 seconds (missing: 8 seconds) |
| segment #y + 4 | 3.5 seconds (missing 6.5 seconds) |
| segment #y + 5 | 6 seconds (missing 4 seconds) |
| segment #y + 6 | 10 seconds (missing 0 seconds, sum 45 seconds) |
| segment #y + 7 | 15 seconds (recover 5 seconds, 40 left) |
| segment #y + 8 | 20 seconds (recover 10 seconds, 30 left) |
| segment #y + 9 | 20 seconds (recover 10 seconds, 20 left) |
| segment #y + 10 | 20 seconds (recover 10 seconds, 10 left) |
| segment #y + 11 | 20 seconds (recover 10 seconds, 0 left) |
| segment #y + 12 | 10 seconds (in sync) |

After segment #y+12, the scrubbing bar and the video stream are back in sync again.

Figure 14:
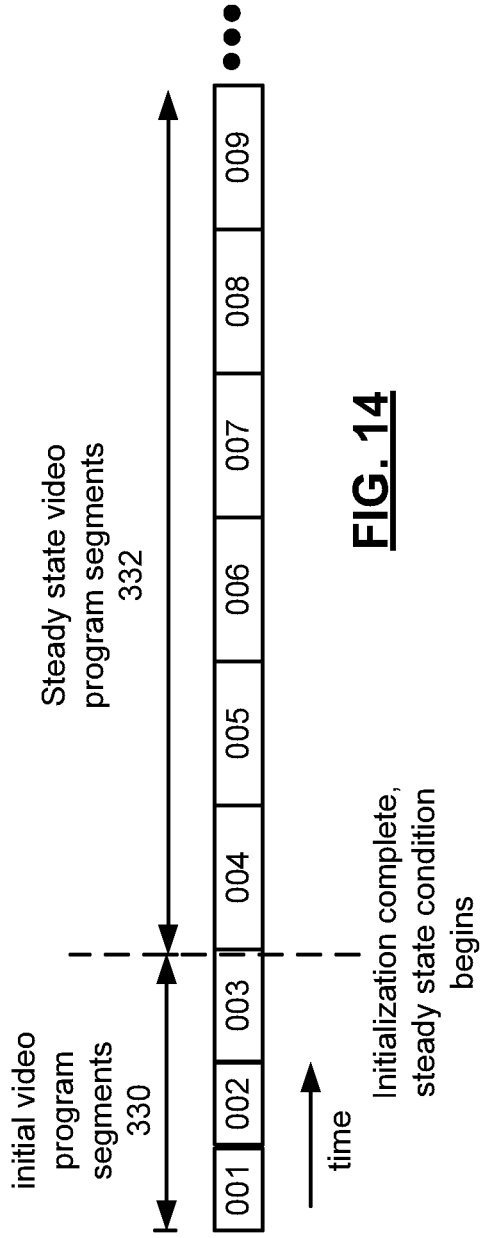
FIG. 14 presents a temporal diagram representation of program segments in accordance with an embodiment of the present invention.

FIG. 14 presents a temporal diagram representation of program segments in accordance with an embodiment of the present invention. During initialization of the streaming video server 50" after receiving a new request for a video program, the initial video program segments 330 are generated with corresponding initialization lengths. The video encoder uses the steady state length for steady state video programs segments 332 after video encoder reaches steady state—when initialization is complete.

It should be noted that a greater or fewer number of initial video program segments 330 can be employed. Further, the length of the initial video program segments 330 shown as shorter than the steady state video program segments 332 but are not drawn to scale.

Figure 15:
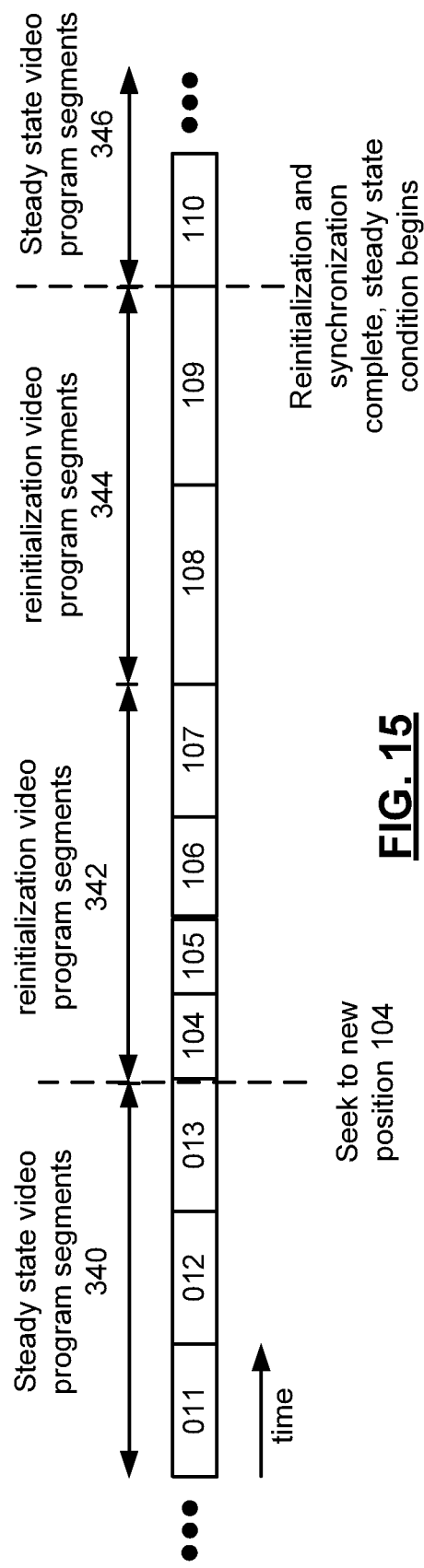
FIG. 15 presents a temporal diagram representation of program segments in accordance with an embodiment of the present invention.

FIG. 15 presents a temporal diagram representation of program segments in accordance with an embodiment of the present invention. The stream begins with a number of steady state video programs segments 340 followed by a seek operation to begin at segment 104 that requires reinitialization. The video encoder 104 responds to length data 322 by generating reinitialization video program segments 342 at reduced lengths. In order to regain synchronization, the video encoder 104 responds to length data 322 to generate reinitialization video program segments 344 at an increased length—in order to make up the time it lost by reducing the length of the first plurality of reinitialization video program segments. When the lost time has been compensated for and synchronization is reached, the video encoder returns to a steady state condition and generates steady state video program segments 346.

It should be noted that a greater or fewer number of reinitialization video program segments 342 and 344 can be employed. Further, the lengths of the reinitialization video program segments 342 and 344 are not drawn to scale.

FIG. 16 presents a flowchart representation of a method in accordance with an embodiment of the present invention. In particular, a method is presented for use in conjunction with one or more functions and features presented in conjunction with FIGS. 1-16. Step 400 includes storing playlist data corresponding to a plurality of video programs available from at least one video source. Step 402 includes storing variant playlist data corresponding to each of the plurality of video programs for streaming each of the plurality of video programs. Step 404 includes bidirectionally communicating with a client device. Step 406 includes receiving a request for a selected one of the plurality of video programs from the client device. Step 408 includes encoding the selected one of the plurality of video programs into a plurality of video program segments in response to the request, wherein the plurality of video program segments each have a length that is controlled based on length data, wherein the plurality of video segments includes at least one initial video program segment having at least one initialization length and a plurality of steady state video program segments having a steady state length and wherein the at least one initialization length is less than the steady state length. When a plurality of initial video program segments are employed, the at least one initialization length can include a single reduced length or different lengths such as a plurality of monotonically increasing lengths that are each less than the steady state length.

FIG. 17 presents a flowchart representation of a method in accordance with an embodiment of the present invention. In particular, a method is presented for use in conjunction with one or more functions and features presented in conjunction with FIGS. 1-16. Step 420 includes generating the length data based on variant playlist data and segment request data.

FIG. 18 presents a flowchart representation of a method in accordance with an embodiment of the present invention. In decision box 430, the method determines if either a steady state condition or a reinitialization condition is detected, based on the segment request data. In step 432, the length data is generated for the plurality of steady state video program segments as a corresponding playlist length indicated by the variant playlist data, when the steady state condition is detected.

In step 434, the length data is generated for at least one first reinitialization video program segment as at least one first reinitialization length that is reduced from the corresponding playlist length when the reinitialization condition is detected. Step 436 includes generating first accumulation data that represents an accumulated difference between the at least one first reinitialization length and the corresponding playlist length for the at least one first reinitialization video program segment. Step 438 includes generating the length data for at least one second reinitialization video program segment as at least one second reinitialization length that is increased from the corresponding playlist length. Step 440 includes generating second accumulation data that represents an accumulated difference between the at least one second reinitialization length and the corresponding playlist length for the at least one second reinitialization video program segment. Decision block 442 returns to step 438 when the second accumulation data compares unfavorably to the first accumulation data and returns to the steady state condition and step 432 when the second accumulation data compares favorably to the first accumulation data.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A streaming server comprising:
a virtual file system that stores playlist data corresponding to a plurality of video programs available from at least one video source and that further stores variant playlist data corresponding to each of the plurality of video programs for streaming each of the plurality of video programs;
a network interface is coupled to bidirectionally communicate with a client device;
a command handler, coupled to the network interface and the virtual file system, receives a request for a selected one of the plurality of video programs from the client device via the network interface;
a video encoder, coupled to the command handler, encodes the selected one of the plurality of video programs into a plurality of video program segments in response to the request that each include a unique portion of the selected one of the plurality of video programs having a plurality of frames, the plurality of video program segments each have a length that is controlled based on length data, wherein the plurality of video segments includes at least one initial video program segment having at least one initialization length and a plurality of steady state video program segments having a steady state length and wherein the at least one initialization length is less than the steady state length; and
a length data generator that generates the length data based on variant playlist data and further based on based on segment request data, wherein the length data generator detects a steady state condition based on the segment request data and generates the length data for the plurality of steady state video program segments as a corresponding playlist length indicated by the variant playlist data when the steady state condition is detected.

2. The streaming server of claim 1 wherein the at least one initialization length includes a plurality of monotonically increasing lengths that are each less than the steady state length and wherein the stead state length is fixed.

3. The streaming server of claim 1 wherein the length data generator detects a reinitialization condition based on the segment request data and wherein the length data generator generates the length data for at least one first reinitialization video program segment as at least one first reinitialization length that is reduced from the corresponding playlist length when the reinitialization condition is detected.

4. The streaming server of claim 3 wherein the length data generator generates first accumulation data that represents an accumulated difference between the at least one first reinitialization length and the corresponding playlist length for the at least one first video program segment and generates the length data for at least one second reinitialization encoded video program segment as at least one second reinitialization length that is increased from the corresponding playlist length.

5. The streaming server of claim 4 wherein the length data generator generates second accumulation data that represents an accumulated difference between the at least one second reinitialization length and the corresponding playlist length for the at least one reinitialization video program segment, and wherein the length data generator returns to the steady state condition when the second accumulation data compares favorably to the first accumulation data.

6. A method for use in a streaming server, the method comprising:
storing playlist data corresponding to a plurality of video programs available from at least one video source;
storing variant playlist data corresponding to each of the plurality of video programs for streaming each of the plurality of video programs;
bidirectionally communicating with a client device;
receiving a request for a selected one of the plurality of video programs from the client device;
encoding the selected one of the plurality of video programs into a plurality of video program segments in response to the request that each include a unique portion of the selected one of the plurality of video programs and that each include a plurality of frames, wherein the plurality of video program segments each have a length that is controlled based on length data, wherein the plurality of video segments includes at least one initial video program segment having at least one initialization length and a plurality of steady state video program segments having a steady state length and wherein the at least one initialization length is less than the steady state length;
detecting a steady state condition based on segment request data; and
generating the length data based on variant playlist data and the segment request data, wherein the length data is generated for the plurality of steady state video program segments as a corresponding playlist length indicated by the variant playlist data when the steady state condition is detected.

7. The method of claim 6 wherein the at least one initialization length includes a plurality of monotonically increasing lengths that are each less than the steady state length and wherein the stead state length is fixed.

8. The method of claim 6 further comprising:
detecting a reinitialization condition based on the segment request data;
wherein the length data is generated for at least one first reinitialization video program segment as at least one first reinitialization length that is reduced from the corresponding playlist length when the reinitialization condition is detected.

9. The method of claim 8 further comprising:
generating first accumulation data that represents an accumulated difference between the at least one first reinitialization length and the corresponding playlist length for the at least one first reinitialization video program segment;
wherein the length data is generated for at least one second reinitialization video program segments as at least one second reinitialization length that is increased from the corresponding playlist length.

10. The method of claim 9 further comprising:
generating second accumulation data that represents an accumulated difference between the at least one second reinitialization length and the corresponding playlist length for the at least one second reinitialization video program segment; and
returning to the steady state condition when the second accumulation data compares favorably to the first accumulation data.

* * * * *